United States Patent
Lin et al.

(10) Patent No.: US 8,452,939 B2
(45) Date of Patent: May 28, 2013

(54) METHOD FOR ESTIMATING CAPACITY USAGE STATUS OF STORAGE UNIT, ASSOCIATED MEMORY DEVICE AND CONTROLLER THEREOF

(75) Inventors: Shu-Yi Lin, Taipei County (TW); Kai-Lung Cheng, Hsinchu (TW); Yuan-Chu Yu, Hsinchu (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 557 days.

(21) Appl. No.: 12/851,557

(22) Filed: Aug. 6, 2010

(65) Prior Publication Data

US 2011/0283069 A1    Nov. 17, 2011

(30) Foreign Application Priority Data

May 11, 2010 (TW) ............................... 99114953 A

(51) Int. Cl.
*G06F 12/00* (2006.01)
(52) U.S. Cl.
USPC ................................. 711/171; 711/E12.084
(58) Field of Classification Search
None
See application file for complete search history.

(56) References Cited

U.S. PATENT DOCUMENTS

| | | | |
|---|---|---|---|
| 5,802,599 A * | 9/1998 | Cabrera et al. ................ | 711/170 |
| 6,732,233 B2 * | 5/2004 | Smith ........................... | 711/114 |
| 7,024,512 B1 * | 4/2006 | Franaszek et al. ............ | 711/100 |
| 7,181,578 B1 * | 2/2007 | Guha et al. .................... | 711/154 |
| 7,409,489 B2 * | 8/2008 | Sinclair ......................... | 711/103 |
| 7,587,566 B2 * | 9/2009 | Ballantyne et al. ........... | 711/163 |
| 2003/0221057 A1 * | 11/2003 | Smith et al. ................... | 711/114 |
| 2005/0050382 A1 * | 3/2005 | Beeston et al. ................ | 714/6 |
| 2006/0069898 A1 * | 3/2006 | Patel et al. .................... | 711/171 |
| 2008/0172525 A1 * | 7/2008 | Nakamura et al. ............ | 711/113 |
| 2008/0295102 A1 * | 11/2008 | Akaike et al. ................. | 718/102 |
| 2010/0077174 A1 * | 3/2010 | Ma et al. ....................... | 711/171 |

FOREIGN PATENT DOCUMENTS

WO    WO 2007019198 A2 *    2/2007

* cited by examiner

*Primary Examiner* — Edward Dudek, Jr.
*Assistant Examiner* — Christopher Birkhimer
(74) *Attorney, Agent, or Firm* — Winston Hsu; Scott Margo

(57) ABSTRACT

The present invention provides a method for estimating a capacity usage status of a storage unit, where the storage unit includes a plurality of sectors. The method includes: estimating capacity usage statuses of a portion of sectors; and utilizing a controller to estimate the capacity usage status of the storage unit according to the estimated capacity usage statuses of the portion of sectors in a situation of not estimating capacity usage statuses of all of the sectors of the storage unit.

15 Claims, 5 Drawing Sheets

| B1 | B2 | B3 | ............... | B512 |

FIG. 3

METHOD FOR ESTIMATING CAPACITY USAGE STATUS OF STORAGE UNIT, ASSOCIATED MEMORY DEVICE AND CONTROLLER THEREOF

BACKGROUND OF THE INVENTION

1. Field of the Invention

The present invention relates to a storage device, and more particularly, to a method for estimating capacity usage status of a storage unit, an associated storage device and an associated controller.

2. Description of the Prior Art

Some external storage devices have screens positioned thereon to show their residual or used capacity. If, however, the residual or used capacity is calculated by a microprocessor of the external storage device, the calculation may require a lot of time because of heavy reading operations. Moreover, because storage capacities of the external storage devices have increased in size, calculating the residual capacity or the used capacity will waste even more time than before, causing inconvenience to the users.

The external storage device also includes a controller and a storage unit, where the controller is used to access the storage unit. Assuming that the controller needs to read data stored in sectors 1 and 2 of the storage unit, a flow of the operations of the controller is described as follows:

Step 1: The controller transmits a position command corresponding to the sector 1 to the storage unit.

Step 2: The controller waits for a response message from the storage unit.

Step 3: After receiving the response message from the storage unit, the controller receives the data stored in sector 1.

Step 4: Steps 1-3 are repeated to receive data stored in the sector 2.

In light of the above, only when the storage unit sends back the response message can the controller receive the data and transmit a next position command to the storage unit. Therefore, how to use this waiting time (Step 2) to enhance the efficiency of the controller is an important topic in this field.

SUMMARY OF THE INVENTION

It is therefore an objective of the present invention to provide a method for estimating a capacity usage status of a storage unit, an associated storage device and an associated controller, which can quickly estimate the residual capacity or the used capacity of the storage unit to solve the above-mentioned problems.

According to one embodiment of the present invention, a method for estimating a capacity usage status of a storage unit is disclosed, where the storage unit comprises a plurality of sectors. The method comprises: estimating capacity usage statuses of a portion of sectors; and utilizing a controller to estimate the capacity usage status of the storage unit according to the estimated capacity usage statuses of the portion of sectors in a situation where not all capacity usage statuses of all sectors of the storage unit are estimated.

According to another embodiment of the present invention, a controller is disclosed, where the controller is utilized to access a storage unit, the storage unit comprises a plurality of sectors, and the controller comprises a memory and a microprocessor. The memory is utilized for storing a program code. The microprocessor is utilized for executing the program code to estimate a capacity usage status of the storage unit, where the microprocessor estimates capacity usage statuses of a portion of sectors, and estimates the capacity usage status of the storage unit according to the estimated capacity usage statuses of the portion of sectors in a situation where not all capacity usage statuses of all sectors of the storage unit are estimated.

According to another embodiment of the present invention, a storage device comprises a storage unit and a controller. The storage unit comprises a plurality of sectors. The controller is coupled to the storage unit, and is utilized for estimating capacity usage statuses of a portion of sectors, and further estimating the capacity usage status of the storage unit according to the estimated capacity usage statuses of the portion of sectors in a situation where not all capacity usage statuses of all sectors of the storage unit are estimated.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2 and 3 are diagrams illustrating a data area of the storage unit shown in FIG. 1.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
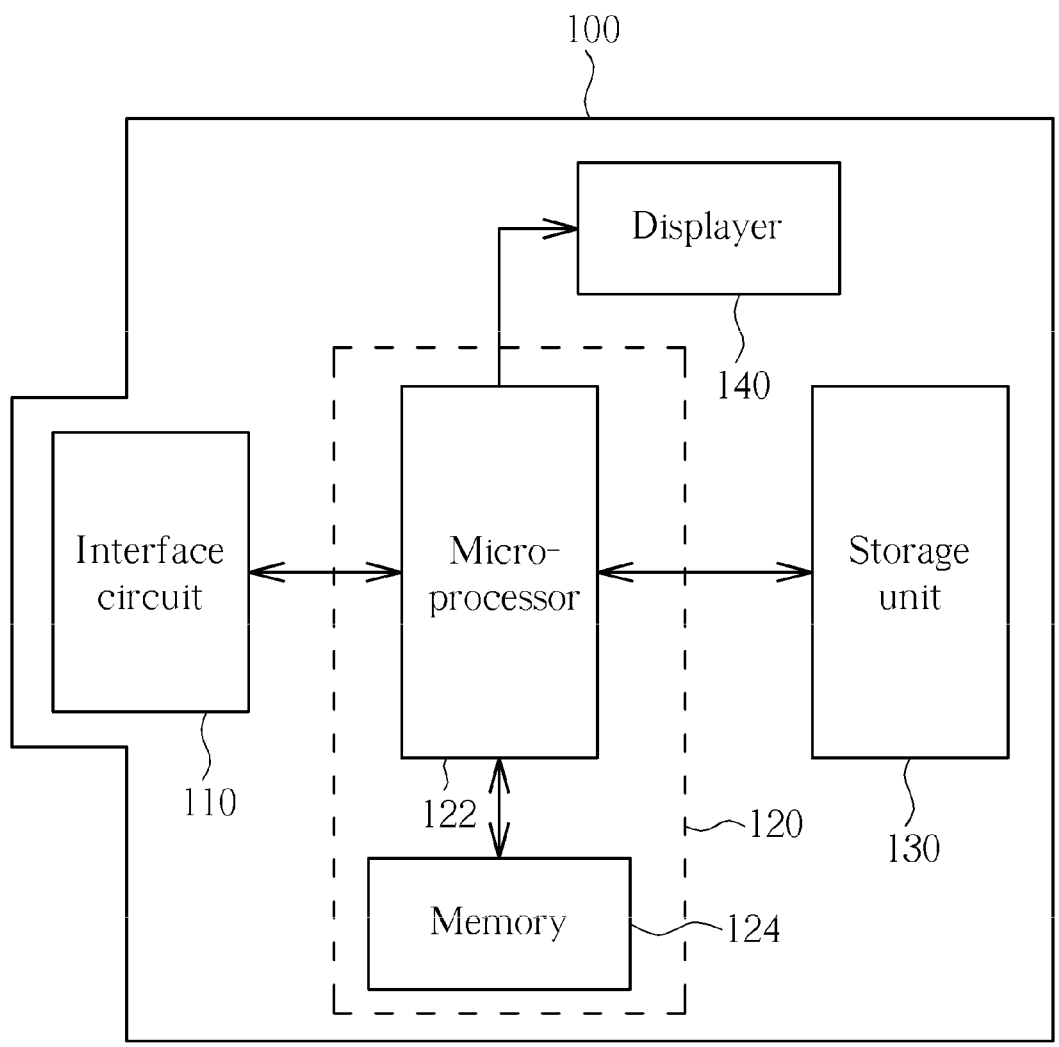
FIG. 1 is a diagram illustrating an external storage device according to one embodiment of the present invention.

Please refer to FIG. 1. FIG. 1 is a diagram illustrating an external storage device 100 according to one embodiment of the present invention. As shown in FIG. 1, the external storage device 100 includes an interface circuit 110, a controller 120, a storage unit 130 and a displayer 140, where the controller 120 comprises a microprocessor 122 and a memory 124. In addition, the external storage device 100 can be any type of external storage device such as an external hard disk, solid state disk, magnetic storage device etc., and an interface of the external storage device can be a USB (Universal Serial Bus) 2.0, USB 3.0 or SATA (Serial Advanced Technology Attachment) interface.

In addition, the memory 124 stores a program code, two acceleration variables Var_A and Var_B, initialization parameters and other variables required when the external storage device is operated.

The external storage device 100 can connect to a host (not shown) via the interface circuit 110, and the host can access the storage unit 130 via the interface 110 and the controller 120. The storage unit 130 can use FAT (File Allocation Table) 16, FAT32, NTFS (New Technology File System) or any other file system.

Figure 2:
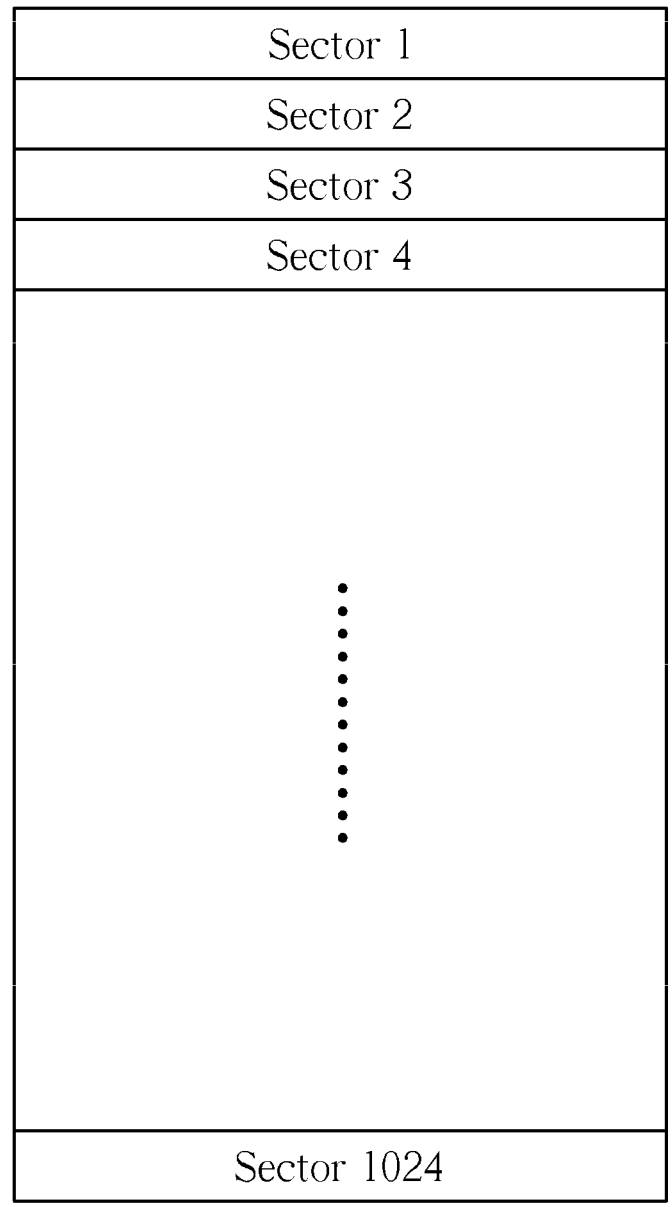
Figure 3:
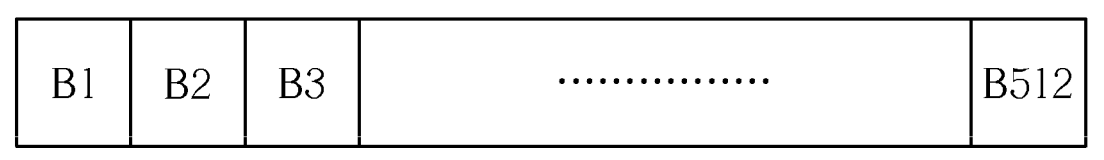

Please refer to FIG. 2 and FIG. 3. FIGS. 2 and 3 are diagrams illustrating a data area of the storage unit 130. As shown in FIGS. 2 and 3, the data area includes 1024 sectors and each sector includes 512 bytes B1, B2, B3, ..., B512. It is noted that the data areas shown in FIGS. 2 and 3 are for illustrative purposes only; in practice, quantity of the sectors and quantity of the bytes in a sector can be determined according to a designer's consideration. In addition, in the following description, it is assumed that the storage unit 130 includes only one data area for simplicity. In practice, however, the storage unit 130 can include many data areas.

Figure 4:
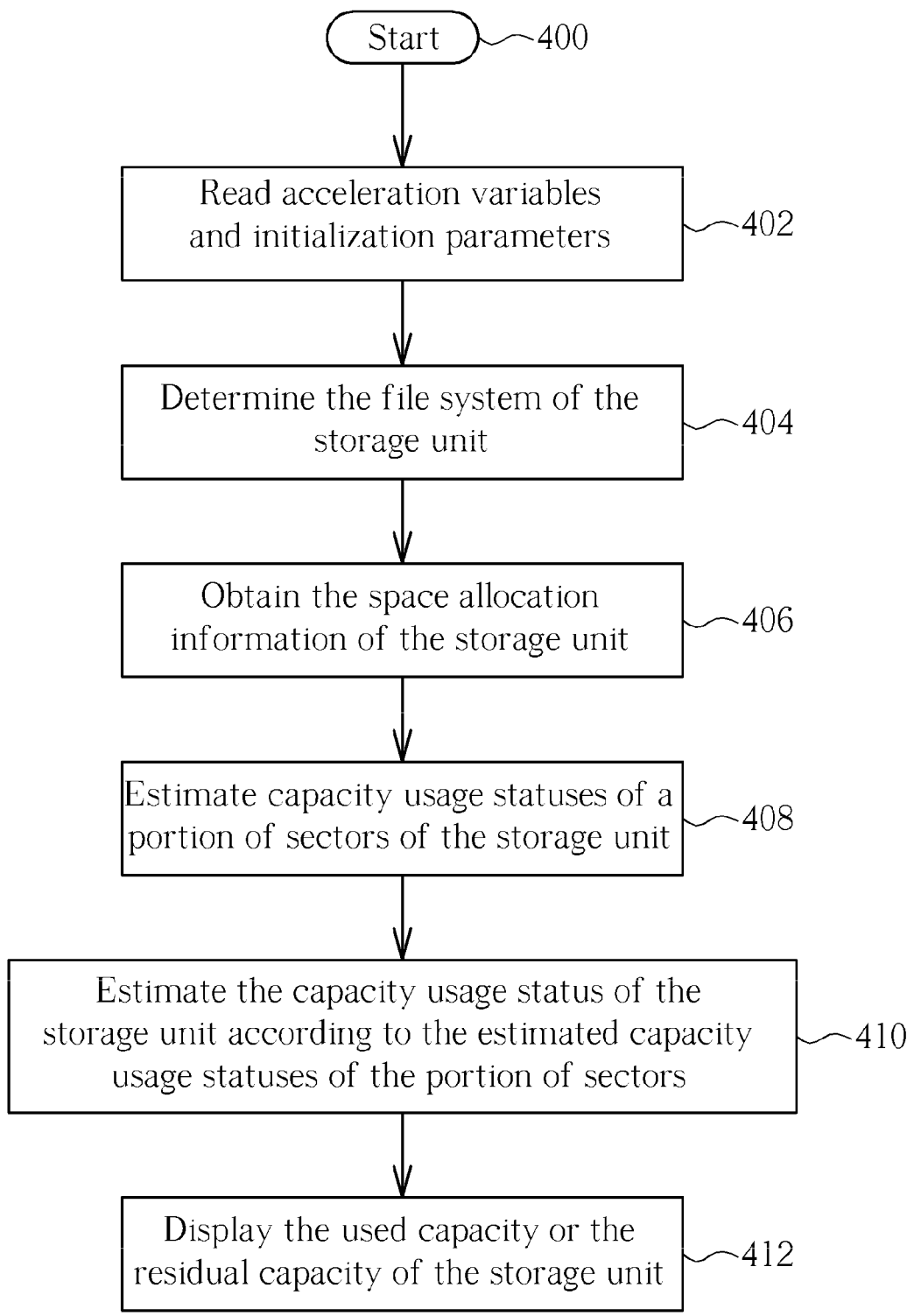
FIG. 4 is a flowchart of estimating a capacity usage status of the storage unit shown in FIG. 1 according to one embodiment of the present invention.

Please refer to FIGS. 1-4 together. FIG. 4 is a flowchart of estimating a capacity usage status of the storage unit 130 according to one embodiment of the present invention. It is noted that, provided the results are substantially the same, the steps are not limited to be executed according to the exact order shown in FIG. 4. Referring to FIG. 4, the flow is described as follows:

In Step 400, the flow starts, and the microprocessor 122 executes the program code stored in the memory 124 to perform the following steps to estimate the capacity usage status of the storage unit 130. Then, in Step 402, the microprocessor 122 reads the acceleration variables Var_A and Var_B and the initialization parameters etc. stored in the memory 124. In Step 404, the microprocessor 122 determines the file system of the storage unit 130. Then, in Step 406, the microprocessor 122 obtains space allocation information of the storage unit 130, i.e., obtains a position of the data area of the storage unit 130.

In Step 408, the microprocessor uses the acceleration variables Var_A and Var_B to estimate capacity usage statuses of a portion of sectors, where the term "capacity usage status" can be "used capacity" or "residual capacity". To describe Step 408 in detail, in one embodiment of the present invention, the acceleration variable Var_A is used to select the portion of sectors. For example, assuming that the acceleration variable Var_A represents an interval between each of the portions of the sectors, and a value of the interval is equal to "5", the portions of sectors are sector 1, sector 6, sector 11, sector 16, sector 21, ..., etc.: that is the microprocessor 122 estimates the capacity usage statuses of the sector 1, sector 6, sector 11, sector 16, sector 21, .... Furthermore, for each of the portion of the sectors, the microprocessor 122 determines if a portion of bytes B1-B512 have data stored therein, and the microprocessor 122 estimates the capacity usage status of the sector according to information about whether a portion of bytes B1-B512 have data stored therein in a situation where it is not determined if all of the bytes B1-B512 have data stored therein. For example, in one embodiment of the present invention, the acceleration variable Var_B is used to select the portion of bytes. For example, assuming that the acceleration variable Var_B represents an interval between each of the portions of bytes, and a value of the interval is equal to "8", the portion of bytes are B1, B9, B17, B25, ..., etc.: that is the microprocessor 122 estimates the capacity usage status of the sector according to the information about whether the bytes B1, B9, B17, B25, etc. have data stored therein.

In addition, many methods can be used to estimate the capacity usage status of the sector according to the information about whether the bytes B1, B9, B17, B25, etc. have data stored therein. For example, the capacity usage status of the sector can be estimated by regarding the storage status of the byte B1 as the storage statuses of the bytes B2-B8 (i.e., if the byte B1 has data stored therein, the bytes B2-B8 are assumed to have data), the storage status of the byte B9 as the storage statuses of the bytes B10-B16 ..., etc. In another example, the capacity usage status of the sector can be estimated by directly summing the data volume of the bytes B1, B9, B17, B25, etc., and then multiplying the summed data volume with a value "8". It should be noted that the above two examples are for illustrative purposes only, and are not a limitation of the present invention.

In Step 410, the microprocessor 122 estimates the capacity usage status of the storage unit 130 according to the estimated capacity usage statuses of the portion of sectors. Similarly, assuming that the portion of sectors are sector 1, sector 6, sector 11, sector 16, sector 21, ..., etc., many methods can be used to estimate the capacity usage status of the storage unit 130. For example, the capacity usage status of the storage unit 130 can be estimated by regarding the capacity usage status of the byte sector 1 as the capacity usage statuses of the sectors 2-5 (i.e., if the data volume of the sector 1 is 200 bytes, the data volume of each of the sectors 2-5 is 200 bytes), the capacity usage status of the byte sector 6 as the capacity usage statuses of the sectors 7-10 ..., etc. In another example, the capacity usage status of the storage unit 130 can be estimated by directly summing the data volume of the sector 1, sector 6, sector 11, sector 16, sector 21, ..., etc., and then multiplying the summed data volume with a value "5". It should be noted that the above two examples are for illustrative purposes only, and are not a limitation of the present invention.

In Step 412, the microprocessor 122 transmits the estimated capacity usage status of the storage unit 130 to the displayer 140, and the displayer 140 shows the received capacity usage status. That is, the displayer 140 displays the used capacity or the residual capacity of the storage unit 130.

It is noted that, in the above embodiment, the acceleration variables Var_A and Var_B are stored in the memory 124, and are read by the microprocessor 122 for further operations in Step 402. In another embodiment of the present invention, however, the acceleration variables Var_A and Var_B can be directly set in the program code stored in the memory 124; that is the microprocessor 122 merely needs to read the initialization parameters in Step 402.

Briefly summarizing the embodiment shown in FIG. 4, the microprocessor 122 determines a precision of the calculated capacity usage status of the storage unit 130 according to the acceleration variables Var_A and Var_B. In other words, in the examples described in Step 408 and Step 410, the lower the acceleration variables Var_A and Var_B, the higher the precision of the calculated capacity usage status of the storage unit 130; similarly, the greater the acceleration variables Var_A and Var_B, the lower the precision of the calculated capacity usage status of the storage unit 130, but the microprocessor 122 requires less time to calculate the capacity usage status. In addition, because the current external storage device generally has a capacity greater than 1 TB (terabyte), it is enough to display the capacity usage status with a precision unit equal to 1 GB (gigabyte). Therefore, the designer or the user can determine the precision of the capacity usage status displayed on the displayer 140 by controlling the acceleration variables Var_A and Var_B.

Figure 5:
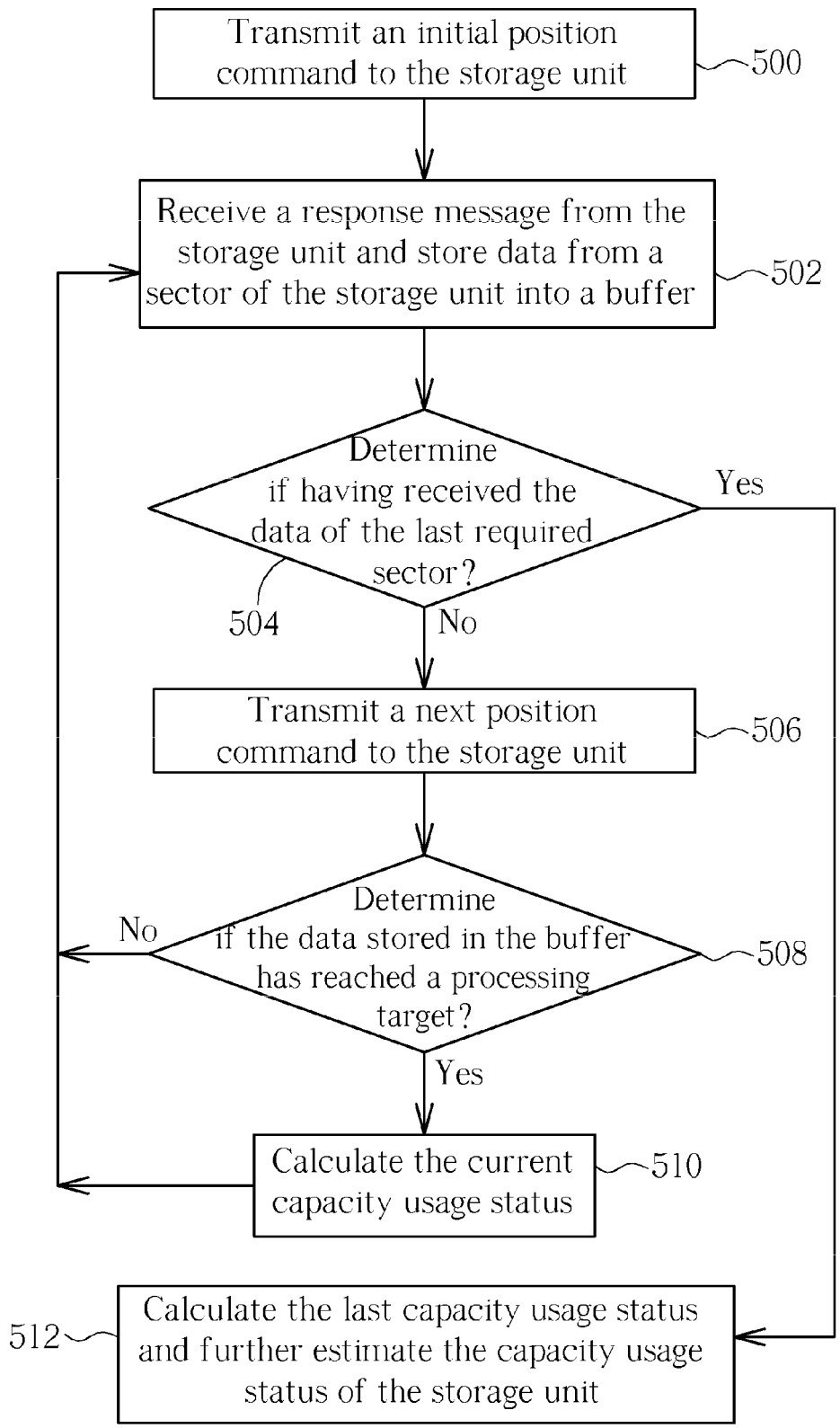
FIG. 5 is a detailed flowchart of Steps 408 and 410 shown in FIG. 4.

Please refer to FIG. 5. FIG. 5 is a detailed flowchart of the Step 408 and Step 410 shown in FIG. 4. Referring to FIG. 5, the flow is described as follows:

In Step 500, the microprocessor 122 transmits an initial position command to the storage unit 130 to ask for data stored in the sector 1. Then, in Step 502, the microprocessor 122 receives a response message from the storage unit 130, and the microprocessor 122 receives the data stored in the sector 1, where the stored data is temporarily stored in a buffer. Then, in Step 504, the microprocessor 122 determines if the data of the last required sector has been received. If not, the flow enters Step 506; if yes, the flow enters Step 512 to calculate the last capacity usage status (i.e., to estimate the capacity usage statuses of the last required one or more sectors according to the current data stored in the buffer), and further to estimate the capacity usage status of the storage unit 130. In Step 506, the microprocessor 122 transmits a next position command to the storage unit 130 to ask for data stored in a next sector. For example, if the value of the acceleration variable Var_A is "5", the microprocessor 122 will transmit the position command corresponding to the sector 6 to the storage unit 130, and wait for the respond message. Then, in Step 508, the microprocessor 122 determines if the data stored in the buffer has reached a processing target (e.g., data volume stored in the buffer has reached 1000 bytes). If not, the flow enters Step 502 to receive the data stored in the next sector (i.e., sector 6); if yes, the flows Step 510 to calculate the current capacity usage status (i.e., to estimate the capacity usage statuses of one or more sectors according to the current data stored in the buffer). Then the flow goes back to Step 502.

In the embodiment shown in FIG. 5, because the microprocessor 122 receives the response message a period of time after the microprocessor 122 transmits the position command to the storage unit 130, to enhance the efficiency of the microprocessor 122, the microprocessor 122 calculates the capacity usage status during this waiting time (Step 510). Therefore, the time required for calculating the capacity usage status can be decreased.

Briefly summarized, in the method for estimating the capacity usage status of the storage unit and the associated storage device and controller of the present invention, only estimated capacity usage statuses of a portion of sectors are estimated, and the capacity usage status of the storage unit is estimated according to the capacity usage statuses of the portion of sectors in a situation where not all the capacity usage statuses of all sectors of the storage unit are estimated. Therefore, the time required for calculating the capacity usage status is significantly decreased.

Those skilled in the art will readily observe that numerous modifications and alterations of the device and method may be made while retaining the teachings of the invention.

What is claimed is:

1. A method for estimating a capacity usage status of a storage unit comprising a plurality of sectors, comprising:
   estimating capacity usage statuses of a portion of sectors; and
   utilizing a controller to estimate the capacity usage status of the storage unit according to the estimated capacity usage statuses of the portion of sectors in a situation where not all capacity usage statuses of all sectors of the storage unit are estimated.

2. The method of claim 1, further comprising:
   reading a variable; and
   determining the portion of sectors among the plurality of sectors according to the variable.

3. The method of claim 1, wherein the portion of sectors includes a plurality of discontinuous sectors, and indexes of the discontinuous sectors are an arithmetic series.

4. The method of claim 1, wherein each of the plurality of sectors includes a plurality of bytes, and the step of estimating the capacity usage statuses of the portion of sectors comprises:
   for a specific sector of the portion of sectors, determining whether a portion of bytes of the specific sector have data stored therein, and estimating a capacity usage status of the specific sector according to information about whether the portion of bytes of the specific sector have data stored therein in a situation of not determining if all of the bytes of the specific sector have data stored therein.

5. The method of claim 4, further comprising:
   reading a variable; and
   determining the portion of bytes among the plurality of bytes of the specific sector according to the variable.

6. The method of claim 4, wherein the portion of bytes includes a plurality of discontinuous bytes, and indexes of the discontinuous bytes are an arithmetic series.

7. The method of claim 1, wherein the portion of sectors comprises at least a first sector and a second sector, and the step of estimating the capacity usage statuses of the portion of sectors comprises:
   reading data stored in the first sector;
   transmitting a position command to the storage unit, where the position command is used to ask for data stored in the second sector;
   after transmitting the position command to the storage device, estimating a capacity usage status of the first sector according to the data read from the first sector;
   receiving a response message corresponding to the position command from the storage unit;
   reading data stored in the second sector according to the response message; and
   estimating a capacity usage status of the second sector according to the data read from the second sector.

8. A controller of a storage device, wherein the controller is utilized for accessing a storage unit comprising a plurality of sectors, the controller comprising:
   a memory, for storing a program code; and
   a microprocessor, for executing the program code to estimate a capacity usage status of the storage unit;
   wherein the microprocessor estimates capacity usage statuses of a portion of sectors; and the microprocessor further estimates the capacity usage status of the storage unit according to the estimated capacity usage statuses of the portion of sectors in a situation where not all capacity usage statuses of all sectors of the storage unit are estimated.

9. The controller of claim 8, wherein the microprocessor reads a variable and determines the portion of sectors among the plurality of sectors according to the variable.

10. The controller of claim 8, wherein the portion of sectors includes a plurality of discontinuous sectors, and indexes of the discontinuous sectors are an arithmetic series.

11. The controller of claim 8, wherein each of the plurality of sectors includes a plurality of bytes, and for a specific sector of the portion of sectors, the microprocessor determines if a portion of bytes of the specific sector have data stored therein, and estimates a capacity usage status of the specific sector according to information about whether the portion of bytes of the specific sector have data stored therein in a situation of not determining if all of the bytes of the specific sector have data stored therein.

12. The controller of claim 11, wherein the microprocessor reads a variable and determines the portion of bytes among the plurality of bytes of the specific sector according to the variable.

13. The controller of claim 11, wherein the portion of bytes includes a plurality of discontinuous bytes, and indexes of the discontinuous bytes are an arithmetic series.

14. The controller of claim 8, wherein the portion of sectors comprises at least a first sector and a second sector, and the microprocessor reads data stored in the first sector; transmits a position command to the storage unit, where the position command is used to ask for data stored in the second sector; after transmitting the position command to the storage device, estimates a capacity usage status of the first sector according to the data read from the first sector; receives a response message corresponding to the position command from the storage unit; reads data stored in the second sector according to the response message; and estimates a capacity usage status of the second sector according to the data read from the second sector.

15. A storage device, comprising:
   a storage unit comprising a plurality of sectors; and
   a controller, coupled to the storage unit, for estimating capacity usage statuses of a portion of sectors; and for estimating a capacity usage status of the storage unit according to the estimated capacity usage statuses of the portion of sectors in a situation of not estimating capacity usage statuses of all of the sectors of the storage unit.

* * * * *